US005083040A

United States Patent [19]

Whitford et al.

[11] Patent Number: 5,083,040

[45] Date of Patent: Jan. 21, 1992

[54] INTEGRATED TURBINE GENERATOR

[75] Inventors: Robert P. Whitford, Sterling; John I. Cofer, IV, Andover, both of Mass.

[73] Assignee: General Electric Company, Schenectady, N.Y.

[21] Appl. No.: 534,244

[22] Filed: Jun. 7, 1990

[51] Int. Cl.[5] ........................ F02C 7/00; H02K 7/00

[52] U.S. Cl. ........................ 290/52

[58] Field of Search ........... 60/39.161, 39.162, 39.183; 290/52

[56] References Cited

U.S. PATENT DOCUMENTS

| | | | |
|---|---|---|---|
| 2,276,695 | 3/1941 | Lavarello | 415/65 |
| 3,832,087 | 8/1974 | Lohonen et al. | 415/199.4 |
| 4,069,673 | 1/1978 | Lapeyre | 290/52 |
| 4,102,599 | 7/1978 | Ziegler | 415/221 |
| 4,159,624 | 7/1979 | Gruner | 60/39.183 |
| 4,192,137 | 3/1980 | Chappell | 60/39.161 |
| 4,253,031 | 2/1981 | Frister | 290/52 |
| 4,309,621 | 1/1982 | Litz | 290/52 |
| 4,362,020 | 12/1982 | Meacher et al. | 60/657 |
| 4,485,310 | 11/1984 | de Valroger | 290/52 |
| 4,531,357 | 7/1985 | Weber et al. | 60/39.07 |
| 4,720,640 | 1/1988 | Anderson et al. | 290/43 |

*Primary Examiner*—A. D. Pellinen
*Assistant Examiner*—Robert L. Hoover
*Attorney, Agent, or Firm*—Nixon & Vanderhye

[57] ABSTRACT

An integrated turbine-generator or compressor-motor having a turbine/compressor mounted radially inwardly of a generator/motor or a generator/motor mounted inward of the turbine/compressor with the turbine, for example, sharing a common rotor with the generator.

11 Claims, 2 Drawing Sheets

FIG. 1
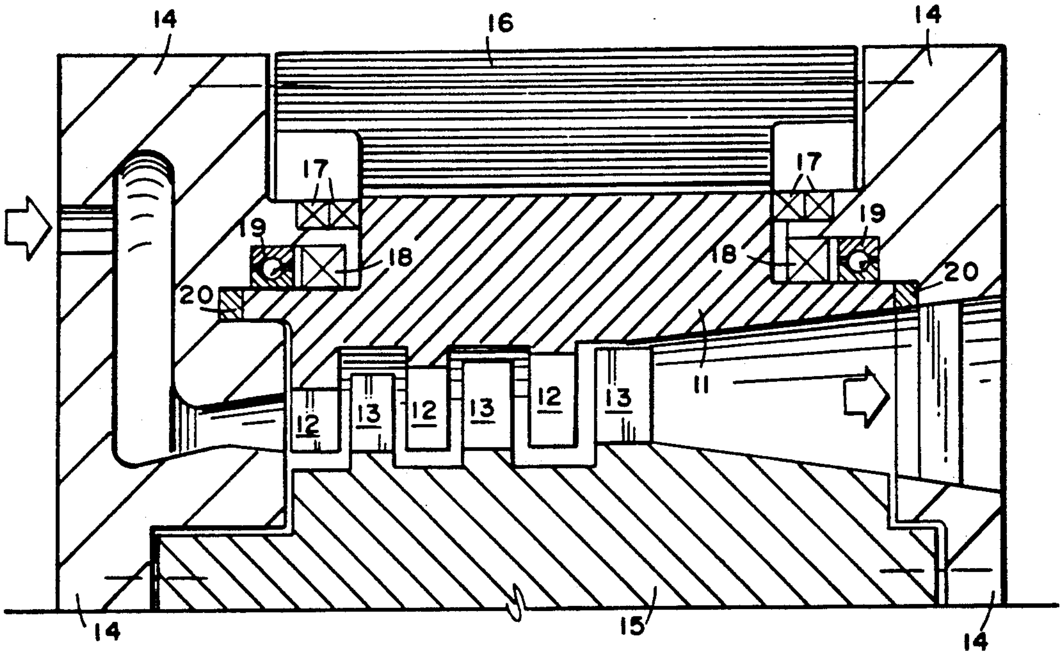
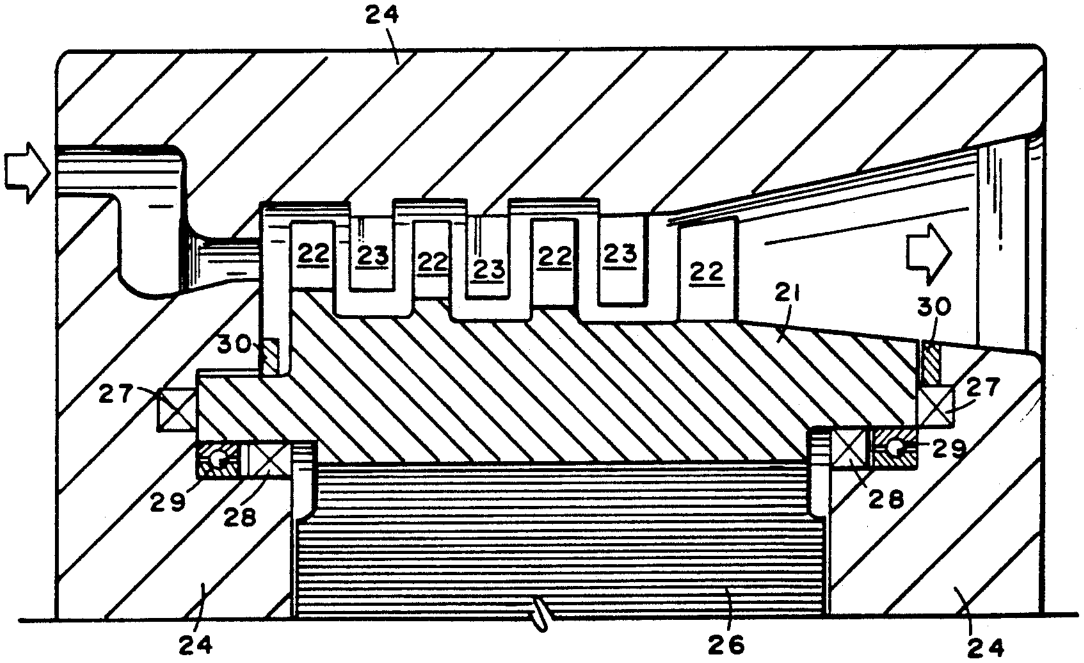
FIG. 2

INTEGRATED TURBINE GENERATOR

FIELD OF THE INVENTION

In general the invention relates to turboelectric generators, pumps and compressors, and in particular to turbine generators, pumps or compressors for use in applications where high power density is required in limited space such as in a typical ship engine room or oil drilling platform and the like.

BACKGROUND AND SUMMARY OF THE INVENTION

Power density (horsepower output divided by weight) improvement efforts in the past have been directed to reductions in size and/or increasing the efficiency of the turbine or the generator as separate entities in the turboelectric art. Still other attempts to increase the power density of such combined elements have been directed to improvements in shaft coupling devices, packing seals, bearings or the reduction of the overall numbers of such devices so as to reduce friction or leakage and thus improve the overall turbine generator or compressor set efficiency.

The objective of our invention is to improve the set performance of motor driven compressors and pumps or turbine generators while reducing size and weight by integrating the component involved with the motion of the fluid (turbine, compressor or pump) and the electrical component (generator or motor) into one piece. The integration is obtained by running the turbine, pump or compressor inside of a generator/motor or, conversely, by running the generator/motor inside of a turbine, pump or compressor. Such integration results in a single combined rotor, one set of bearings instead of two, and the elimination of a coupling requirement between the turbine and generator or motor. Additionally, no shafts protrude through casings and, therefore, shaft seals are eliminated. The reduced number of bearings and the elimination of shaft seals inherently reduce friction and leakage losses which lead to an increase in efficiency. Moreover, the reduction in weight of the integrated unit also leads to increased efficiency. Of equal importance, however, is the reduction in overall space or machinery "footprint" requirements which are particularly important in commercial applications such as oil drilling platforms and shipboard engine rooms, for example, where space is at a premium. These and further objects and advantages of the present invention will become more apparent upon reference to the following specification, appended claims and drawings.

BRIEF DESCRIPTION OF THE DRAWINGS

FIG. 1 is a cross-sectional view of one exemplary embodiment of the invention illustrating a turbine inside of a generator/motor wherein the turbine and generator/motor share a common rotor with generator/motor pole pieces attached to the outside diameter of the rotor;

FIG. 2 is an alternative embodiment also illustrated in cross section wherein the generator/motor is inside of a turbine and wherein again a common rotor is used with turbine blades attached to the outside diameter thereof and the generator/motor pole pieces are included on the inside diameter of the rotor.

DETAILED DESCRIPTION OF THE DRAWINGS

Figure 3:
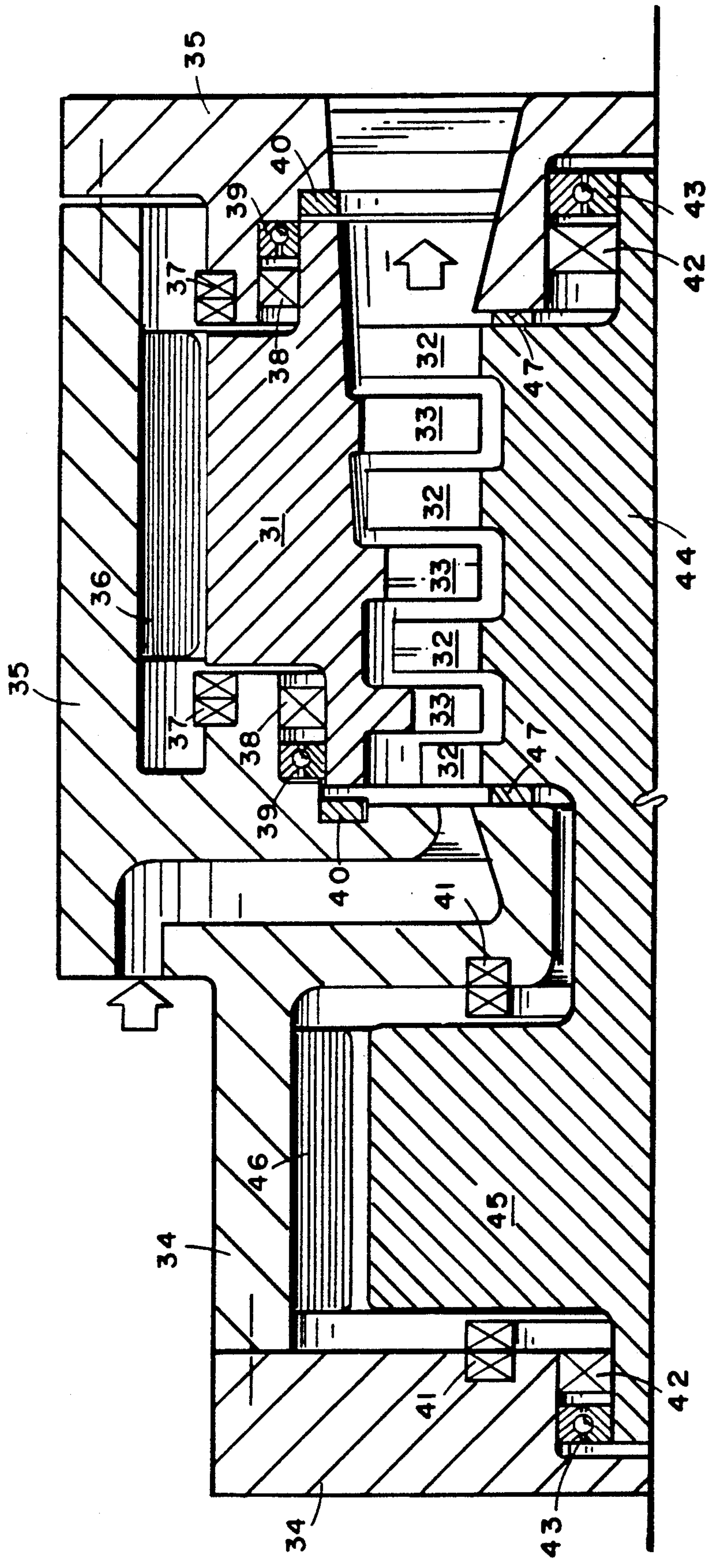
FIG. 3 illustrates in cross section a still further exemplary embodiment which includes counter rotating rotors.

FIG. 1 is illustrative of one exemplary embodiment of the integrated turbine generator/motor wherein the turbine is incorporated radially inwardly of the generator/motor and wherein the generator/motor and turbine share a common rotor 11. That is to say, rotor 11, which is in the form of a hollow generally cylindrical structure, includes permanent magnet pole pieces on the outside diameter of the cylinder and additionally includes turbine blades 12 attached to the inside of the rotor cylinder. Casing elements 14 in addition to holding the generator/motor stator 16, rotatably supports rotor 11 and rotating blades 12. On the other hand, inwardly spaced central casing element 15 supports the stationary blades 13 of the turbine. Additionally, as illustrated in the figure, the recited elements and blades form the inlet, exhaust and circuitous turbine fluid path.

Although only schematically shown, each of the rotatable and stationary blades, 12 and 13 respectively, are a circular array of blades with the several arrays disposed along the rotor and casing in an axial direction with the blades extending radially as shown. The arrays are also axially arranged in an alternating rotatable and stationary or interdigitated manner.

Stator 16 may include a three phase winding, for example, arranged in a circumferential manner about the rotor. In one embodiment of the invention, the rotor is caused to rotate and generate electrical energy in the stator windings when pressurized fluid such as steam is applied to the blade arrays in the direction of the arrows. In a second embodiment of the invention, with appropriately designed blade arrays, fluid may be pumped or compressed when electrical energy is applied to the windings.

Rotor 11 is mounted in casing elements 14 through the use of magnetic thrust bearings 17 as well as magnetic journal bearings 18 placed in the manner illustrated at both ends of the rotor. Since the turbine generators contemplated are quite large and the cost of large diameter ball and roller bearings is quite significant, non-contacting magnetic bearings were selected; although, obviously, other bearing forms may be used. Use of magnetic journal bearings, however, dictates somewhat the further use of auxiliary catcher bearings 19. Such catcher bearings which provide half of the air space or air gap provided by the magnetic journal bearings act as a backup bearing to protect the magnetic bearing in the event of a power failure. Additionally, although the rotating components can be levitated while being shut down or at rest, the catcher bearings permit the safe rundown of the shaft speed and prevent damage to the magnetic bearings by providing static support for the shaft when the equipment is in a shutdown condition. The advantages of the magnetic bearings, of course, are that of better performance due to the lower friction, non-contacting characteristic of such bearings as well as providing lower noise and eliminating the need of an oil system for lubrication and cooling purposes. Completing the mounting arrangement of the rotor are the use of seals 20 to prevent the entrance of steam at the rotor ends.

Clearly the overall space and machinery footprint requirements of the design as illustrated in FIG. 1, for example, are substantially reduced from systems having discrete turbine generator/motor elements with the requisite shaft, couplings, bearings and seals. Such additional elements reduce the efficiency of the overall system due to friction and leakage losses as well as further losses due to the added weight of the shaft, seals and coupling.

Advantages similar to those noted with respect to FIG. 1 may also be obtained with the exemplary embodiment of the integrated turbine generator of FIG. 2 where, although again there is a common rotor, the generator/motor is inside of the turbine rather than the reverse as illustrated in FIG. 1. The common rotor 21 includes movable blades 22 attached to the outer surface of the rotor; whereas, the generator pole pieces would be attached to the inside diameter of the rotor. The generator stator 26 is located radially inward from the rotor and is attached at its ends to the casing elements 24. Casing elements 24 additionally include bearings and seals similar to those found in FIG. 1 for mounting the turbine generator/motor rotor 21. The casing, for example, includes magnetic thrust bearings 27 and magnetic journal bearings 28. Additionally included in the casing 24 are backup or catcher bearings 29 as well as seal elements 30. Casing element 24 in addition to holding the stationary turbine blades 23 forms the steam path for the turbine. As in the embodiments of FIG. 1, blades 22 and 23 are representative of circular arrays of circumferentially disposed blades. Moreover, the structure is operable as a turbine generator or motor pump or compressor as in the earlier described embodiments.

The integrated turbine generator of FIG. 2 also clearly provides the relatively small footprint requirements as well as the enhanced efficiency characteristics noted with regard to the exemplary embodiment of FIG. 1. As will be appreciated by those skilled in the art, fastening means are used to connect casing parts and the like. Additionally, drum type construction is utilized to stack stationary and rotating turbine blades in the fluid path illustrated in FIG. 1. As will be additionally appreciated, the embodiment of FIG. 2 offers the additional advantage of requiring smaller diameter bearings than the design found in FIG. 1.

Illustrated in FIG. 3 is a still further embodiment involving two counter rotating rotors which offers the advantage of reducing the rotor speed by 50% and also reducing the bearing sizes. Rotor 31 and stator 36 are similar to the generator rotor and stator elements of FIG. 1 including the use of magnetic thrust bearings 37 and journal bearings 38 as well as the backup roller bearings 39 and seals 40 for mounting the generator rotor. The turbine blades 33 associated with rotor 31 are rotatable in one direction; whereas, turbine blades 32 associated with the counter rotating rotor 44 rotate in opposition to blades 33. The rotor 44 includes a permanent magnet generator rotor portion 45 which works in combination with stator portion 46 of the generator. Rotor 44 in addition to including counter rotating blades 32 is mounted in casing elements 34 and 35 in the same general manner as rotor 31, for example, by the inclusion of magnetic thrust and journal bearings 41 and 42 as well as catcher, backup roller bearings 43 and seals 47. As illustrated in FIG. 3, casing elements 34 and 35 as well as turbine blades 32 and 33 provide the fluid path for turbine generator operation.

The overall space and footprint requirements of the exemplary embodiment of FIG. 3 is relatively large in comparison to that which is found in FIGS. 1 and 2. However, in addition to the inclusion of two generators, the FIG. 3 embodiment would clearly occupy less overall space than would be required by prior art non-integrated arrangements wherein a single turbine drives two generators. Accordingly, the power output to weight ratio or power density of the FIG. 3 embodiment as well as the embodiments of FIGS. 1 and 2 are improved by the integration techniques incorporated into all three of the exemplary embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An integrated power unit apparatus, said apparatus comprising:

a stationary central casing having circular arrays of stationary blades disposed along said central casing in an axial direction, said blades extending in a radial manner from said central casing;

a hollow, substantially cylindrical rotor including magnetic pole piece means about the outer periphery thereof, said rotor being circumferentially disposed about said central casing and said stationary blades;

said rotor including circular arrays of rotatable blades disposed along said rotor in an axial direction, said blades extending in a radial direction toward said central casing, the stationary blade arrays of said central casing and said rotatable blade arrays of said rotor being interdigitated in the axial direction;

an outer casing spaced from said central casing, said rotor being rotatably supported therein and said arrays of blades being interdigitated in the space between said central casing and said rotor;

said outer casing further including stator windings surrounding said rotor and disposed in said outer casing.

2. The apparatus of claim 1 operable in a first arrangement when pressurized fluid is applied to said arrays of blades to cause said rotor to rotate and generate electrical power in said windings.

3. The apparatus of claim 2 operable in a second arrangement when electrical power is applied to said windings to cause said rotor to rotate and pump or compress fluid through said space between said central casing and said rotor.

4. The apparatus as specified in claim 1 wherein said rotor is rotatably supported in the outer casing by bearing means.

5. The apparatus as specified in claim 4 wherein said bearing means include magnetic thrust and journal bearing means.

6. The apparatus as specified in claim 5 wherein said bearing means further include backup roller bearings acting in cooperation with said magnetic journal bearing means.

7. An integrated turbine generator apparatus, said apparatus comprising:

a first stationary casing means, said casing means including first stator windings means disposed adjacent one end of said casing and within and about the periphery of said casing at said one end;

a first rotor means disposed radially inwardly of said first casing and rotatably supported thereby, said first rotor means including pole piece means adjacent said first windings at said one end, said first rotor means further including at the other end thereof first plural circular arrays of rotatable blades disposed in an axial direction, said blades also extending in a radial direction away from the said first rotor means;

a second outer casing means disposed in a spaced circumferential relationship to the said other end of said first rotor means to form a fluid path therebetween, said second casing means including second stator winding means disposed within and about the periphery of said second casing means;

a second hollow rotor means including pole piece means adjacent said second stator winding means, said second rotor means disposed circumferentially between said second stator winding means and said first rotor means, said second rotor means rotatably supported by said second outer casing means and including second plural circular arrays of rotatable blades disposed along said first rotor means in an axial direction, said blades also extending in a radially inward direction, and said first and second plural arrays of rotatable blades being arranged in an interdigitated manner in the axial direction.

8. The apparatus of claim 7 wherein the first and second rotor means are caused to counter rotate when pressurized fluid is applied to said arrays of blades.

9. The apparatus of claim 7 wherein said first and second rotor means are supported for rotation by magnetic bearing means.

10. The apparatus of claim 9 wherein said bearing means include magnetic thrust and journal bearing elements.

11. The apparatus of claim 10 wherein said bearing means further include backup roller bearings acting in cooperation with said magnetic journal bearing elements.

* * * * *